US012000206B1

(12) United States Patent
Chapman

(10) Patent No.: US 12,000,206 B1
(45) Date of Patent: Jun. 4, 2024

(54) SNAP-ON SAFETY GUARD FOR DOOR GAPS

(71) Applicant: Adam Curry Chapman, Chicago, IL (US)

(72) Inventor: Adam Curry Chapman, Chicago, IL (US)

( * ) Notice: Subject to any disclaimer, the term of this patent is extended or adjusted under 35 U.S.C. 154(b) by 103 days.

(21) Appl. No.: 17/952,382

(22) Filed: Sep. 26, 2022

Related U.S. Application Data

(63) Continuation-in-part of application No. 17/327,943, filed on May 24, 2021, now Pat. No. 11,466,511.

(51) Int. Cl.
*E06B 7/00* (2006.01)
*E06B 7/36* (2006.01)

(52) U.S. Cl.
CPC ........ *E06B 7/367* (2013.01); *E06B 2007/365* (2013.01)

(58) Field of Classification Search
CPC ........................... E06B 7/367; E06B 2007/365
See application file for complete search history.

(56) References Cited

U.S. PATENT DOCUMENTS

| | | | | |
|---|---|---|---|---|
| 6,134,839 | A | 10/2000 | Johansson | |
| 6,434,888 | B1 * | 8/2002 | Shaw | E06B 7/367 16/258 |
| 6,826,877 | B1 | 12/2004 | Stradel | |
| 10,329,834 | B2 * | 6/2019 | Mertinooke | E06B 7/2301 |

* cited by examiner

*Primary Examiner* — Daniel J Troy
*Assistant Examiner* — Daniel Alvarez
(74) *Attorney, Agent, or Firm* — Donald J. Ersler

(57) ABSTRACT

A snap-on safety guard for door gaps preferably includes a jamb split tube and a cover plate. The jamb split tube includes a lengthwise gap. A curved jamb device is retained in a kerf slot of a kerf-style door frame. A molding lip extends inward from one end of the curved jamb device and a kerf lip extends inward from an opposing end thereof. A U-shaped clip is retained in a kerf slot of a kerf-style door frame. The U-shaped clip includes a kerf base, an inner kerf lip and an outer kerf lip. An L-shaped clip is retained in a kerf slot of a kerf-style door. The cover plate preferably includes a flat plate with at least one living hinge formed parallel with a length of the cover plate. An inner surface of the cover plate is attached to one of the jamb tubes.

2 Claims, 6 Drawing Sheets

SNAP-ON SAFETY GUARD FOR DOOR GAPS

CROSS-REFERENCES TO RELATED APPLICATIONS

This is a continuation-in-part patent application, which takes priority from patent application Ser. No. 17/327,943, filed on May 24, 2021.

BACKGROUND OF THE INVENTION

Field of the Invention

The present invention relates generally to rooms and more specifically to a snap-on safety guard for door gaps, which prevents children and others from inserting their fingers into door gaps when the door is opened or closed.

Discussion of the Prior Art

Child-proof door jamb covers have been provided in the past for preventing the pinching of children's fingers between doors and door jambs as doors open and close. Many village, city, and county ordinances in communities in the United States require such door jamb covers to ensure the safety of our children. Unfortunately, existing door safety solutions require full door replacement with new continuous hinges, or drilling/screwing into existing doors and door frames, and/or using strong adhesives to attach products to existing doors and associated door jambs.

Landlords have lease provisions that prohibit damage to the leased property by the tenant and thus prevent invasive door add-on products that require drilled-in screws and/or damage-causing strong adhesives. Other building codes often restrict adding any significant attachments to the face of the swinging door itself. Additionally, if the swinging door uses a continuous hinge, adding non-invasive attachments to the door becomes even more challenging. Finally, many landlords want the swinging door component of a door frame to remain in a fully paintable state at all times.

To date, it is believed that no front-side-of-door (non-hinge-pin-side-of-door) child-safety finger guard mounting system has been introduced that is sturdy, easy to install, removable, requires no screws (nor screwdrivers) nor damaging adhesives, and works on continuous-hinge or non-continuous-hinge doors, all while also minimizing installed parts on the actual swinging door. The existence of a fast, simple and effective product that incorporates a removable, no-tools-required, door-frame-mounted approach that relies on the presence and natural location of the existing door frame features will result in a vast number of installed child finger guards, greatly improving the safety of many.

Many door gap guards are disclosed among the prior art, but they all suffer from one or more drawbacks. There are five U.S. Pat. Nos. 6,134,839; 5,765,311; 5,778,601; 6,434,888, and 8,505,168 that involve attaching safety add-ons to the front side of doors, but these require a screwdriver, screws and, in some cases, a drill, to be used in attaching an elongated protective plate designed to cover the dangerous gap between the door and the door jamb. Unfortunately, the need for a screwdriver and screws is a complexity that deters many people from using these solutions. For one, landlords have lease provisions that prohibit damage and alterations to leased property by tenants. Secondly, installing screws into the door and door jamb requires more physical strength and know-how than many people possess. Finally, screw sizes vary and often a correctly-sized screwdriver is not readily available. These obstacles collectively prevent the installation of products that would protect building owners' and tenants' children as well as their guests' children. What is needed is an easy-to-install, removable, front-side-of-the-door mounting assembly that does not damage the door or door frame with screws or strong adhesives, and which allows the attachment of safety products, vertically, along the door frame on the front side of the door (non-hinge-pin side of door), while covering the dangerous door jamb gap area through all possible door open and closed positions.

A guard disclosed in U.S. Pat. No. 10,138,673B1 involves a spring-hinge-biased elongated plate being affixed to the swinging door itself, via u-brackets, but this method does not work on continuous hinge doors. Additionally, when installed, it prevents the door from being easily paintable. What is needed is an easy-to-install, removable, front-side-of-the-door mounting assembly that does not damage the door or door frame with screws or strong adhesives, and which allows the attachment of safety products, vertically, along the door frame on the front side of the door (non-hinge-pin side of door), while covering the dangerous door jamb gap area through all possible door open and closed positions, while leaving the swinging door in a paintable state, and while adapting to both continuous-hinge and non-continuous-hinge door system environments.

To overcome the identified issues of existing products, the present invention provides a new method for improving home safety and/or home livability by allowing the easy installation of useful safety add-on products to the front side (not the back side, where the hinge-pins are located) of hinged door frames. The present invention involves an add-on for a hinged door system in which a finger safety device is affixed to the front side of a door in a manner that requires no screws, no damaging paint-stripping adhesives, and minimal installation parts. The safety device is also notable for being easily removable, returning the door to its original condition once removed. The safety device is also notable for its lack of strong interference with the existing swinging door, which allows the door to be painted while the device is installed.

Accordingly, there is a clearly felt need in the art for a snap-on safety guard for door gaps, which prevents children and others from inserting their fingers into door gaps when the door is opened or closed, creates a minimal footprint upon the door system while installed, and may later be removed, leaving all door surfaces, door frame surfaces, and door hardware in their original conditions.

SUMMARY OF THE INVENTION

The present invention provides a snap-on safety guard for door gaps, which may be removed leaving all door surfaces, door frame surfaces, and door hardware in their original conditions. The snap-on safety guard for door gaps (snap-on door guard) preferably includes a jamb split tube and a cover plate. The jamb split tube can have a substantially circular cross-sectional shape or a substantially square cross-sectional shape. The substantially circular cross section includes opposing flat surfaces on either side of a lengthwise gap. It is preferable that the substantially square tube be chamfered in all four corners. The lengthwise gap is formed in one of the four sides of the substantially square tube. The jamb split tube must be fabricated from a resilient material having memory properties, such that when jamb split tube is deformed, it returns to its original shape. The jamb split tube does not have to have a length, which is equal to the height of a door. The length may be slightly longer than a height of the reach of a child.

An adjustable jamb split tube includes a first jamb section and a second jamb section. Adjacent ends of the first and second jamb sections are secured to each other, when installed on a door. The securement of the adjacent ends may be implemented with fasteners; hook and loop fasteners; snaps; double sided tape; or any other suitable securement device. The opposing ends (opposing edges) of the jamb sections are deformed, such that one opposing edge is placed over an outer edge of an outside door molding and the other opposing edge of the jamb sections are placed over the inner edge of the door jamb molding.

A substantially curved jamb device is configured for retention in a kerf slot of a kerf-style door frame. The curved jamb device includes a substantially curved cross section. A molding lip extends inward from one end of the curved jamb device and a kerf lip extends inward from an opposing end of the curved jamb device. The molding lip is retained on an edge of an inner molding of a door frame. The kerf lip is retained inside the kerf slot of the kerf-style door frame. A thermal installation seal is retained in the kerf slot. However, there is sufficient space to retain the kerf lip of the semi-circular tube.

A U-shaped clip is configured for retention in a kerf slot of a kerf-style door frame. The U-shaped clip includes a kerf base, an inner kerf lip and an outer kerf lip. The inner kerf lip extends outward from one end and one side of the kerf base. The outer kerf lip extends from an opposing end of the kerf base and from the same side as the inner kerf lip. The inner kerf lip is retained inside the kerf slot of the kerf-style door frame. An inner surface of the outer kerf lip makes contact with an outer surface of the kerf frame.

An L-shaped clip is configured for retention in the kerf slot of a kerf-style door frame. The L-shaped clip includes a kerf base and an inner kerf lip. The inner kerf lip extends outward from one end and one side of the kerf base. The inner kerf lip is retained inside the kerf slot of the kerf-style door frame. An inner surface of the kerf base makes contact with an outer surface of the kerf slot.

The cover plate preferably includes a flat plate with at least one living hinge formed parallel with a length of the cover plate. A single living hinge forms two parallel lengthwise panels. However, it may be advantageous to create three parallel panels or more in the cover plate instead of two to decrease pressure on an outside of a door. The cover plate must be fabricated from a resilient material having memory properties, such that when the cover plate is deformed, it returns to its original shape. The cover plate preferably has the same length as a height of the jamb split tube, the adjustable jamb split tube, the semi-circular tube, the U-shaped clip and the L-shaped clip. A pressure sensitive adhesive is preferably used to join an inside surface of a first lengthwise panel to an outside surface of the jam split tube, the adjustable jamb split tube, the semi-circular tube, the U-shaped clip and the L-shaped clip. An edge of the second or last lengthwise panel contacts an outer surface of a door. However, the jamb split tube and the cover plate may be fabricated from a single piece of material, which would eliminate the need for the pressure sensitive adhesive.

The pressure sensitive adhesive is preferably used to join an inside surface of a first lengthwise panel to an outside surface of the second jamb section. The pressure sensitive adhesive is preferably used to join an inside surface of a first lengthwise panel to an outside surface of the semi-circular tube. The pressure sensitive adhesive is preferably used to join an inside surface of a first lengthwise panel to an outside surface of the outer kerf lip. The pressure sensitive adhesive is preferably used to join an inside surface of a first lengthwise panel to an outside surface of the kerf base.

Accordingly, it is an object of the present invention to provide a snap-on door guard, which prevents children and others from inserting their fingers into door gaps when the door is opened or closed.

It is a further object of the present invention to provide a snap-on door guard which requires no screws or strong adhesives to be used when being installed upon the door system.

It is an additional object of the present invention to provide a snap-on door guard which also acts as a weather stripping to prevent a draft from entering through a door frame.

It is yet a further object of the present invention to provide a snap-on door guard, which prevents a stalker from looking through a crack in a door jamb.

Finally, it is another object of the present invention to provide a snap-on door guard, which may be removed, leaving all door surfaces, door frame surfaces, and door hardware in their original condition.

These and additional objects, advantages, features and benefits of the present invention will become apparent from the following specification.

DETAILED DESCRIPTION OF THE PREFERRED EMBODIMENTS

Figure 1:
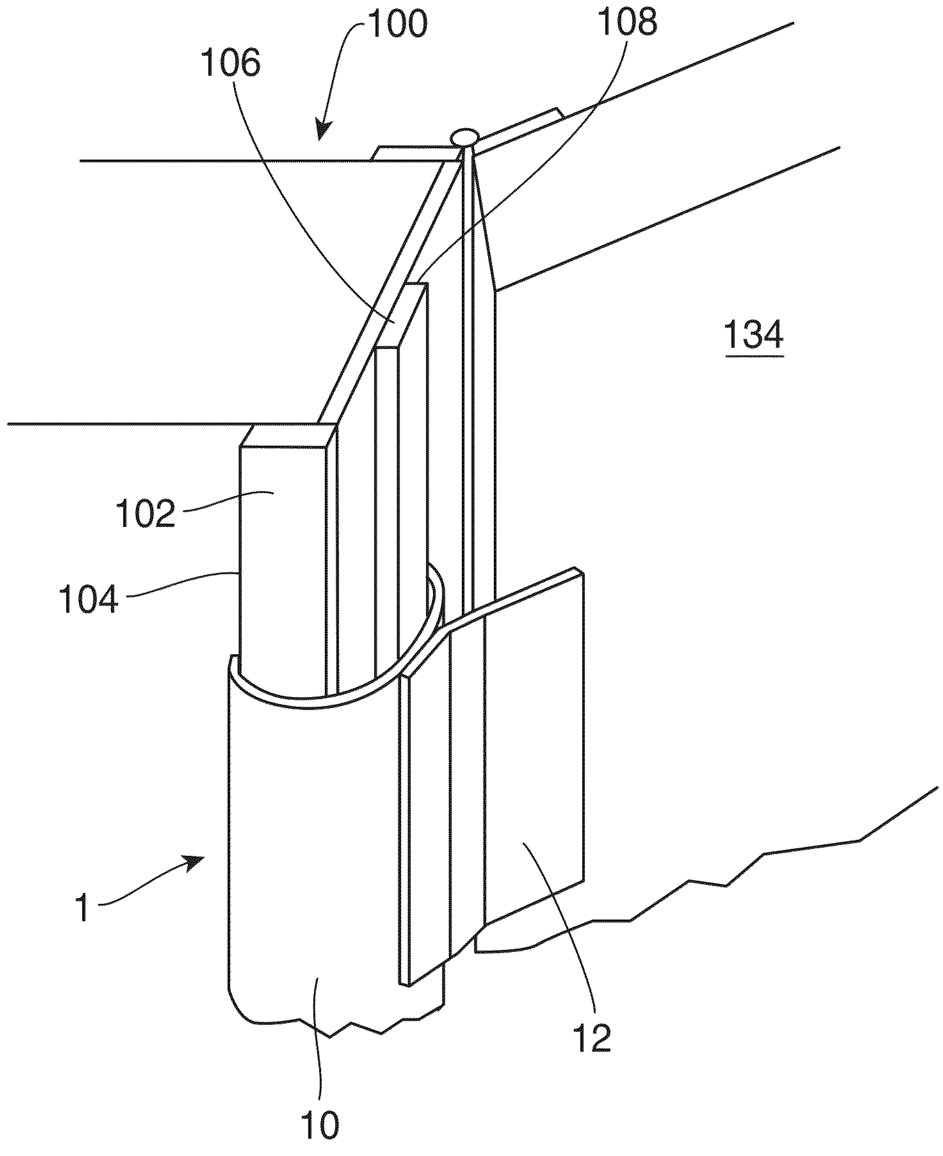
FIG. 1 is a perspective view of a snap-on door guard installed on an outer edge of an outside door molding and an inner edge of the door jamb molding with a cover plate contacting a door in accordance with the present invention.
Figure 2:
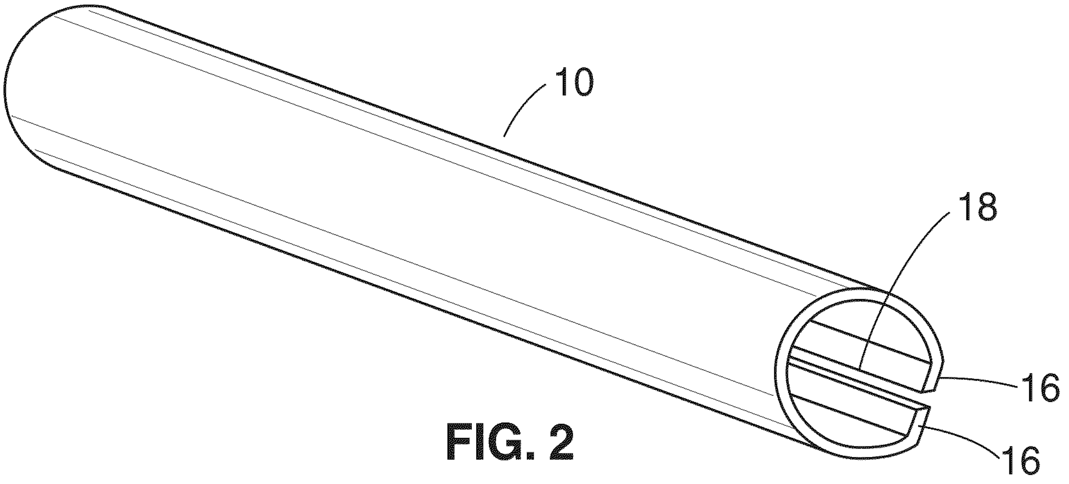
FIG. 2 is a perspective view of a jamb split tube having a substantial round cross section of a snap-on door guard in accordance with the present invention.
Figure 3:
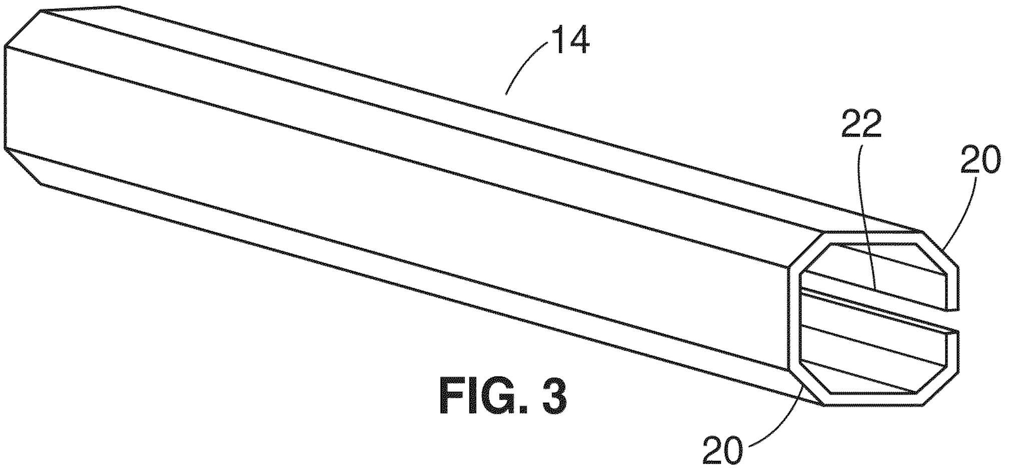
FIG. 3 is a perspective view of a jamb split tube having a substantial rectangular cross section of a snap-on door guard in accordance with the present invention.
Figure 4:
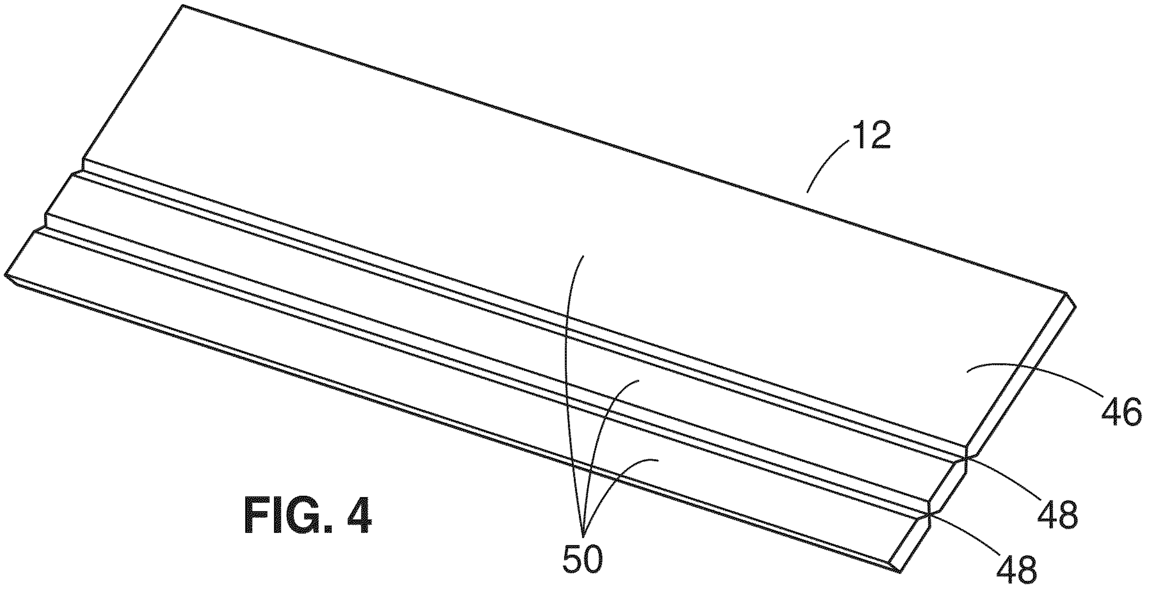
FIG. 4 is a perspective view of a cover plate of a snap-on door guard in accordance with the present invention.
Figure 6:
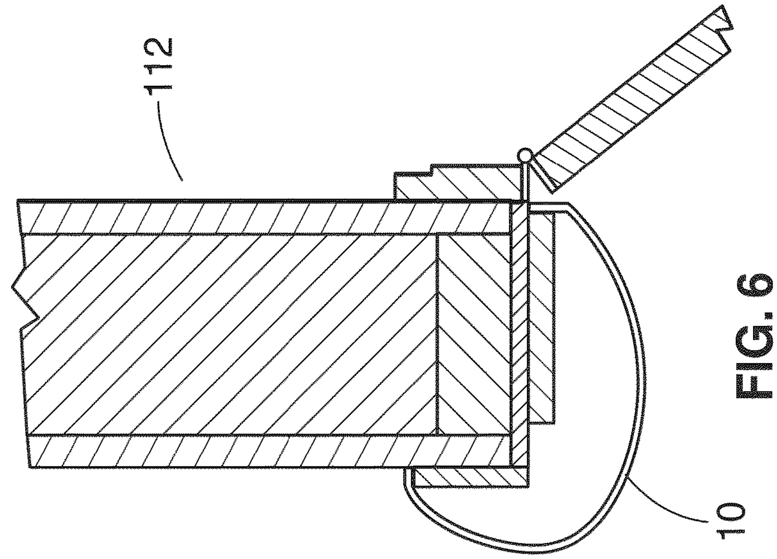
FIG. 6 is a cross sectional view of a snap-on door guard installed on an outer edge of an outside door molding and an inner edge of the door jamb molding with a wall that is thicker than that shown in FIG. 5 in accordance with the present invention.
Figure 7:
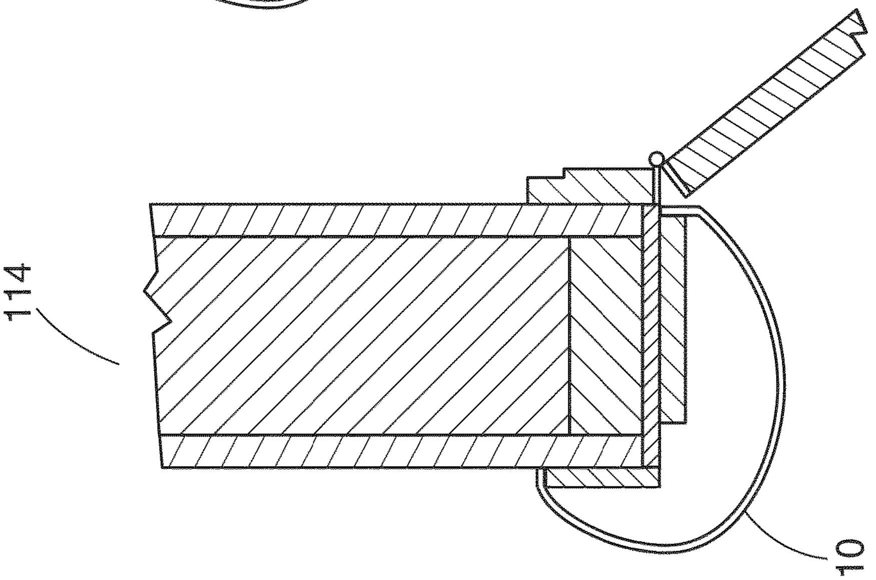
FIG. 7 is a cross sectional view of a snap-on door guard installed on an outer edge of an outside door molding that is longer than that shown in FIG. 6 and an inner edge of the door jamb molding in accordance with the present invention.
Figure 5:
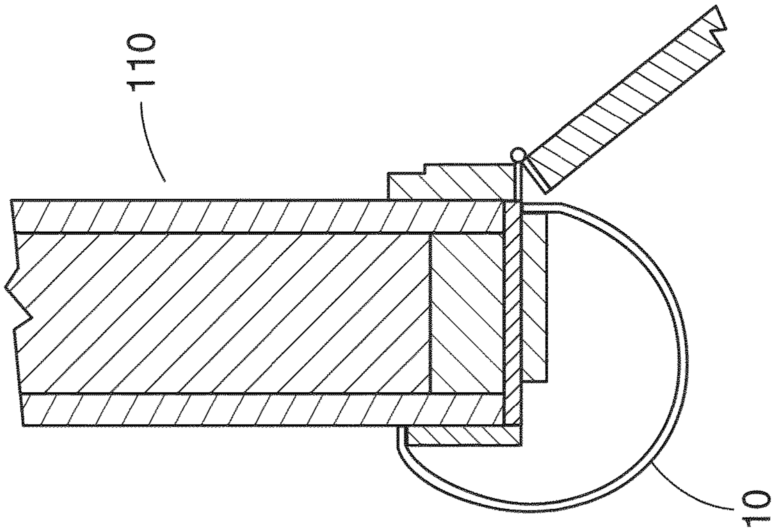
FIG. 5 is a cross-sectional view of a snap-on door guard installed on an outer edge of an outside door molding and an inner edge of the door jamb molding in accordance with the present invention.
Figure 9:
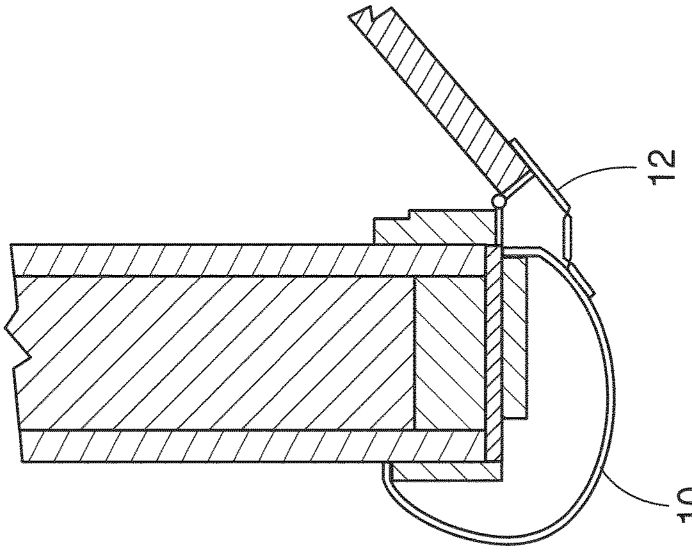
FIG. 9 is a cross-sectional view of a snap-on door guard installed on an outer edge of an outside door molding and an inner edge of the door jamb molding with a cover plate contacting a door that is open in accordance with the present invention.

With reference now to the drawings, and particularly to FIG. 1, a perspective view of a snap-on door guard 1 is installed on an outer edge 104 of an outside door molding 102 and an inner edge 108 of the door jamb molding 106 of a door frame 100. With reference to FIGS. 2-4, the snap-on door guard 1 preferably includes a jamb split tube 10, 14 and a cover plate 12. The jamb split tube 10 includes a tubular cross section. The tubular cross section may have a substantially circular shape or a substantially rectangular shape. The cross-sectional shape of the jamb split tube 10, 14 depends upon the shape of the door frame. The jamb split tube 10 preferably includes opposing flat surfaces 16 on either side of a lengthwise gap 18. It is preferable that the jamb split tube 14 include chamfers 20 in all four corners. A lengthwise gap 22 is formed in one of the four sides of the jamb split tube 14. The jamb split tube 10, 14 must be fabricated from a resilient material having memory properties, such that when the jamb split tube 10, 14 is deformed, it returns to its original shape. The material must also have sufficient hoop strength for the jamb split tube 10, 14 to stay in place, once placed on molding, such that the jamb split tube 10, 14 must be spread, before securing on the molding. A length of the jamb split tube 10, 14 does not have to be equal to a height of a door. The length of the jamb split tube 10, 14 may be slightly longer than a height of the reach of a child. FIGS. 5-7 illustrate the jamb split tube 10 flexing for retention on different door frames 110, 112, 114 having different thicknesses and sized moldings.

Figure 10:
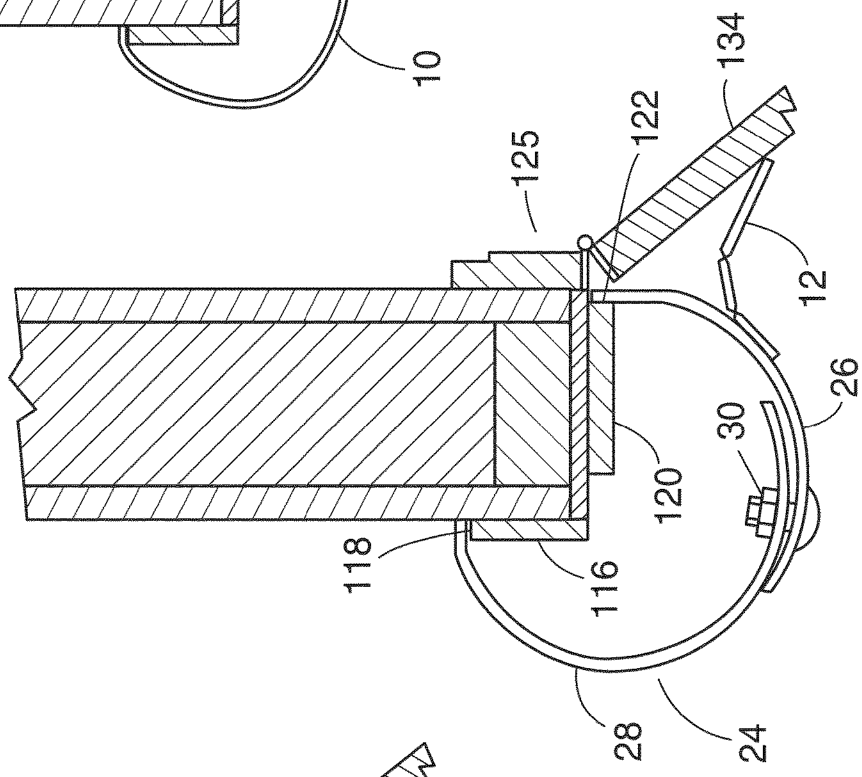
FIG. 10 is a cross-sectional view of a snap-on door guard with an adjustable split jamb tube installed on an outer edge of an outside door molding and an inner edge of the door jamb molding with a cover plate contacting a door that is open in accordance with the present invention.
Figure 8:
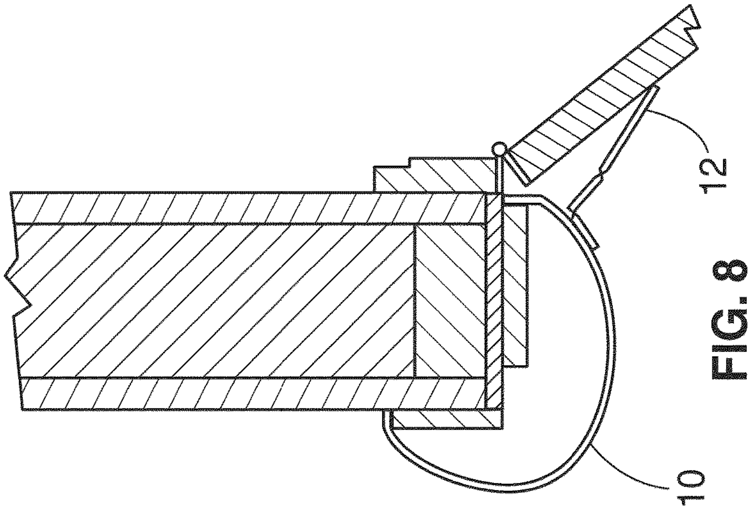
FIG. 8 is a cross-sectional view of a snap-on door guard installed on an outer edge of an outside door molding and an inner edge of the door jamb molding with a cover plate contacting a door that is nearly closed in accordance with the present invention.

With reference to FIG. 10, an adjustable jamb split tube 24 includes a first jamb section 26 and a second jamb section 28. Adjacent ends of the first and second jamb sections are secured to each other, when installed on the door frame 125. Securement of the adjacent ends may be implemented with fasteners 30; hook and loop fasteners; snaps; double sided tape; or any other suitable securement device. The opposing ends (opposing edges) of the first and second jamb sections 26, 28 are deformed, such that one opposing edge of the second jamb section 28 is placed over on outer edge 118 of an outside door molding 116 and the other opposing edge of the first jamb section 28 is placed over an inner edge 122 of door jamb molding 120.

Figure 11:
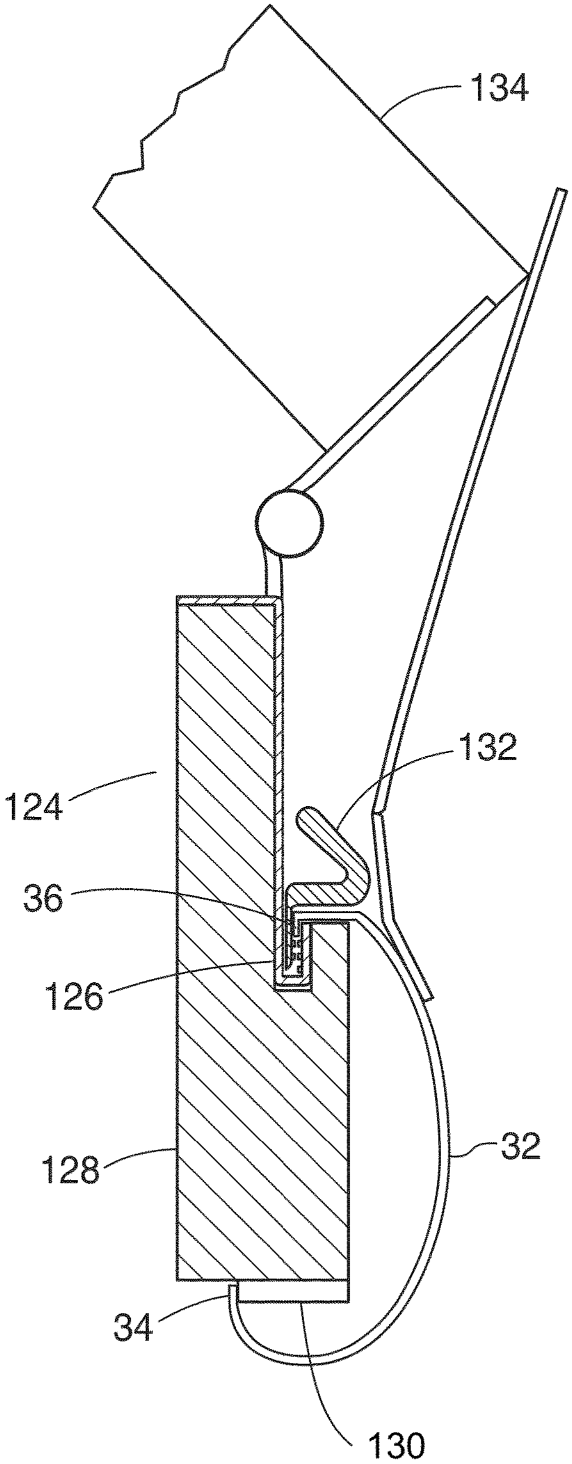
FIG. 11 is a cross-sectional view of a snap-on door guard with a curved jamb device, the curved jamb device includes one end configured for retention in a kerf slot of a kerf-style door frame and an opposing end configured for retention on an outside door molding with a cover plate contacting a door that is open in accordance with the present invention.

With reference to FIG. 11, a curved jamb device 32 is configured for retention in a kerf slot 126 of a kerf-style door frame 124. The curved jamb device 32 includes a substantially curved cross section. A molding lip 34 extends inward from one end of the curved jamb device 32 and a kerf lip 36 extends inward from an opposing end of the curved jamb device 32. The molding lip 34 is retained on an edge of an inner molding 130 of a door frame 128. The kerf lip 36 is retained inside the kerf slot 126 of the kerf-style door frame 124. A thermal installation seal 132 is normally retained in the kerf slot 124. However, there is sufficient space to retain the kerf lip 36 of the curved jamb device 32 in the kerf slot 124.

Figure 12:
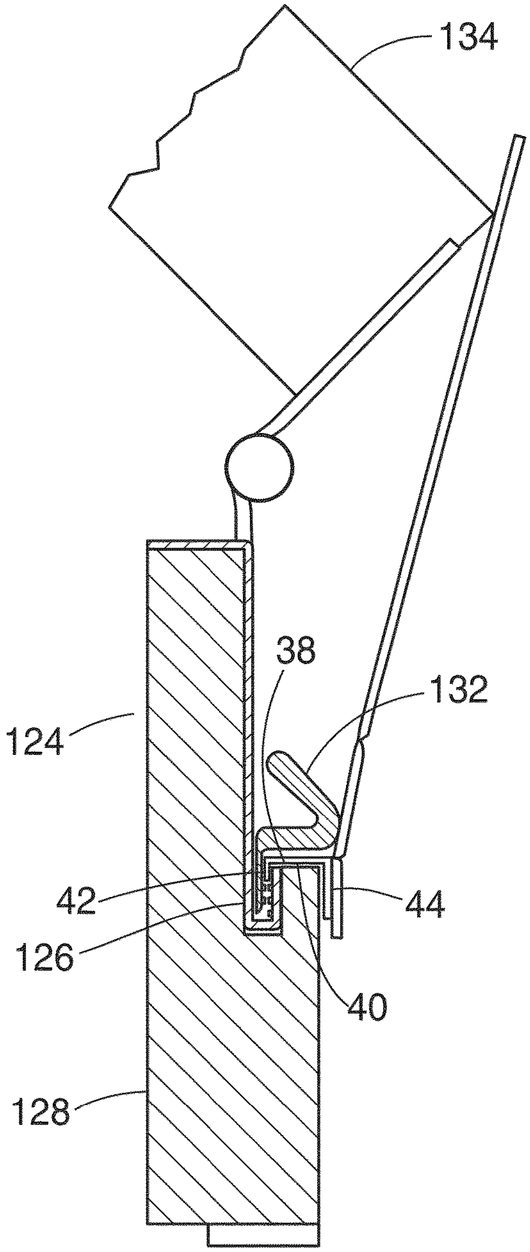
FIG. 12 is a cross-sectional view of a snap-on door guard with a U-shaped clip, the U-shaped clip is configured for retention in a kerf slot of a kerf-style door frame and an opposing end is retained on an outside door molding with a cover plate contacting a door that is open in accordance with the present invention.

With reference to FIG. 12, a U-shaped clip 38 is configured for retention in the kerf slot 126 of a kerf-style door frame 124. The U-shaped clip 38 includes a kerf base 40, an inner kerf lip 42 and an outer kerf lip 44. The inner kerf lip 42 extends outward from one end and one side of the kerf base 40. The outer kerf lip 44 extends from an opposing end of the kerf base 40 and on the same side as the inner kerf lip 42. The inner kerf lip 42 is retained inside the kerf slot 126 of the kerf-style door frame 124. The outer kerf lip 44 makes contact with an outer surface of the kerf slot 126.

Figure 13:
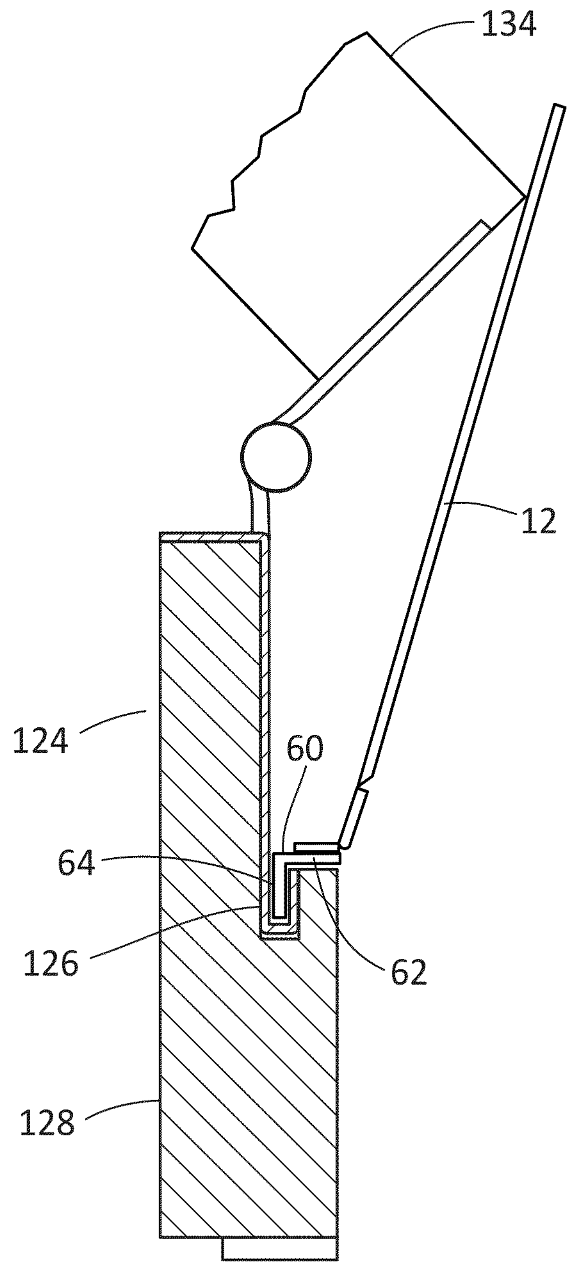
FIG. 13 is a cross-sectional view of a snap-on door guard with an L-shaped clip, the L-shaped clip is configured for retention in a kerf slot of a kerf-style door frame, an end of a cover plate is attached to a kerf base of the L-shaped clip, the cover plate contacts a door that is open in accordance with the present invention.

With reference to FIG. 13, a L-shaped clip 60 is configured for retention in the kerf slot 126 of a kerf-style door frame 124. The L-shaped clip 60 includes a kerf base 62 and an inner kerf lip 64. The inner kerf lip 64 extends outward from one end and one side of the kerf base 62. The inner kerf lip 64 is retained inside the kerf slot 126 of the kerf-style door frame 124. An inner surface of the kerf base 62 makes contact with an outer surface of the kerf slot 126.

With reference to FIG. 4, the cover plate 12 preferably includes a flat plate 46 with at least one living hinge 48 formed parallel with a length of the cover plate 12. A single living hinge 48 forms two parallel lengthwise panels 50. However, it may be advantageous to create three or more parallel lengthwise panels 50 in the cover plate 46 instead of two to decrease pressure on an outside of a door 134. The cover plate 12 must be fabricated from a resilient material having memory properties, such that when the cover plate 12 is deformed, it returns to its original shape. With reference to FIGS. 8-13, the cover plate 12 preferably has the same length as a height of the jamb split tube 10, 14, the adjustable jamb split tube 24, the semi-circular tube 32, the U-shaped clip 38 and the L-shaped clip 60. A pressure sensitive adhesive is preferably used to join an inside surface of a first lengthwise panel 50 to an outside surface of the jam split tube 10, 14, the adjustable jamb split tube 24, the curved jamb tube 32, the U-shaped clip 38 and the L-shaped clip 60. An edge of the second or last lengthwise panel 50 contacts an outer surface of a door 134. However, the jamb split tube 10, 14, the curved jamb tube 32, the U-shaped clip 38, the L-shaped clip 60 and the cover plate 12 may be fabricated from a single piece of material, which would eliminate the need for the pressure sensitive adhesive.

A pressure sensitive adhesive is preferably used to join the inside surface of the first lengthwise panel 50 to an outside surface of the second jamb section 28. A pressure sensitive adhesive is preferably used to join the inside surface of a first lengthwise panel 50 to an outside surface of the semi-circular tube 32. A pressure sensitive adhesive is preferably used to join the inside surface of the first lengthwise panel 50 to an outside surface of the outer kerf lip 44. A pressure sensitive adhesive is preferably used to join the inside surface of the first lengthwise panel 50 to an outside surface of kerf base 62.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A snap-on safety guard for covering door gaps between an edge of a kerf door and a kerf door frame when the kerf door is open, the kerf door frame includes a kerf slot, said snap-on safety guard, comprising:

a L-shaped clip includes a kerf base and an inner kerf lip, wherein said inner kerf lip is retained in the kerf slot, said kerf base is in contact with an outside surface of said kerf door frame; and a cover plate includes a first lengthwise panel, a second lengthwise panel and a third lengthwise panel, said first and second lengthwise panels are joined to each other with a first living hinge, said first lengthwise panel extends from an outer surface of said kerf base, said second and third lengthwise panels are joined to each other with a second living hinge, wherein said third lengthwise panel contacts the kerf door.

2. The snap-on safety guard for covering door gaps of claim 1 wherein:

said cover plate is secured to an outer surface of said outer kerf lip with at least one securement device.

* * * * *